US005257035A

United States Patent [19]

Funahashi et al.

[11] Patent Number: 5,257,035

[45] Date of Patent: * Oct. 26, 1993

[54] PERFECTING PRINTER AND METHOD FOR CONTROLLING DOUBLE-FACE PRINTING OPERATION THEREOF

[75] Inventors: Hiroyuki Funahashi, Seto; Toru Tsuzuki, Okazaki; Masahiro Murakami, Hekinan; Hajime Usami, Nagoya; Kiyoshi Takahashi, Aichi, all of Japan

[73] Assignee: Brother Kogyo Kabushiki Kaisha, Nagoya, Japan

[ * ] Notice: The portion of the term of this patent subsequent to Nov. 13, 2007 has been disclaimed.

[21] Appl. No.: 478,512

[22] Filed: Feb. 12, 1990

[30] Foreign Application Priority Data

Feb. 14, 1989 [JP] Japan .................................. 1-34273

[51] Int. Cl.5 ........................ G01D 9/00; G03D 21/00

[52] U.S. Cl. ..................................... 346/1.1; 346/160; 355/320; 355/23; 355/24

[58] Field of Search ...................... 355/23, 24, 26, 319, 355/320; 358/404, 444; 364/519; 346/153.1, 1601.1

[56] References Cited

U.S. PATENT DOCUMENTS

| | | | |
|---|---|---|---|
| 4,453,841 | 6/1984 | Bobick et al. | 400/126 |
| 4,499,500 | 2/1985 | Nagashima | 358/296 |
| 4,839,740 | 6/1989 | Yoshida | 358/498 |
| 4,855,790 | 8/1989 | Suzuki | 355/24 |
| 4,860,119 | 8/1989 | Maniwa et al. | 358/296 |
| 4,907,094 | 3/1990 | Mishima et al. | 358/404 X |
| 4,956,717 | 9/1990 | Suzuki et al. | 346/136 X |
| 4,970,661 | 11/1990 | Tsuzuki et al. | 364/519 |

FOREIGN PATENT DOCUMENTS

| | | |
|---|---|---|
| 62-134282 | 6/1987 | Japan . |
| 63-293063 | 11/1988 | Japan . |

*Primary Examiner*—Benjamin R. Fuller
*Assistant Examiner*—Randy W. Gibson
*Attorney, Agent, or Firm*—Oliff & Berridge

[57] ABSTRACT

A perfecting printer for performing a double-face printing operation of printing images on obverse and reverse faces of at least one sheet on the basis of a series of print data input from an external device and a method for controlling the double-face printing operation of the printer. The perfecting printer includes a page memory having an empty area for storing a series of print data for the obverse and reverse faces of the sheet input from external device, and a control unit for judging as to whether the empty area is no longer available in the page memory while the series of print data are being stored into the page memory and forcibly printing print data for the obverse face of the sheet on the sheet when it is judged that the empty area is no longer available in the page memory and that only the print data for the obverse face of the sheet are completely stored in the page memory.

12 Claims, 2 Drawing Sheets

PERFECTING PRINTER AND METHOD FOR CONTROLLING DOUBLE-FACE PRINTING OPERATION THEREOF

BACKGROUND OF THE INVENTION

The present invention relates to a perfecting printer such as a laser printer or the like, and more particularly, to a perfecting printer having a control unit for controlling a double-face printing operation thereof.

As disclosed in Japanese Laid-Open Patent Publication No. 59(1984)-179354, there has been already known a perfecting printer such as a laser printer in which data such as character data, graphic data or the like can be printed on both the obverse and reverse faces of a sheet. In order to print such data on both of the faces of the sheet (that is, to perform a double-face printing or a perfecting printing operation, the following operation has been generally adopted in the conventional perfecting printer: Print data to be printed on both of obverse and reverse faces of one or more sheets, which are transferred from a host computer or the like, are stored through an input buffer into a storage area in a page memory of the perfecting printer and then converted into an image data represented by a binary digit in a video RAM, thereafter perfecting a printing operation based on the image data.

In the perfecting printer as described above, almost the entire storage area of the page memory is almost used to store the print data, and therefore there occurs a possibility that the page memory runs out of any empty area capable of storing the print data therein, that is, the page memory becomes full of a part of the print data to be stored before a process of storing all of the print data for plural sheets having double-face pages into the page memory is completed, (hereunder referred to as "memory-full state").

If the perfecting printer adopts a face-down discharge operation in which a printed sheet is discharged with its obverse face down, it is required that an image is printed first on the reverse face of the sheet, and then on its obverse face. Accordingly, in order to perform the face-down discharge operation in the perfecting printer, it is required to entirely store the print data for double faces of a sheet in the page memory.

In the conventional perfecting printer, if the memory-full state occurs in the page memory during the storing operation of the print data into the page memory, a control unit, which is generally provided in the perfecting printer, recognizes the memory-full state as a memory-full error, interrupts any subsequent operations for storing and printing the print data, and waits for an instruction from an operator. In accordance with indication of the memory-full error, the operator clears the page memory and then selects a one-page printing mode (a single-face printing mode) to retransmit the print data for the single face of the sheet from the host computer to the perfecting printer. Therefore, the memory-full state of the page memory lowers the throughput of the printing device.

SUMMARY OF THE INVENTION

It is an object of the present invention to provide a perfecting printer in which even when a memory-full error occurs during a double-face printing operation, a series of print data to be printed on obverse and reverse faces of one or more sheets for all pages of the sheets can be completely printed without interrupting or ceasing the double-face printing operation, so that the throughput of the printer can be increased.

In order to achieve the above object, according to one aspect of the present invention, a perfecting printer for printing images on obverse and reverse faces of at least one sheet on the basis of a series of print data including first print data and second print data to be printed on obverse and reverse faces of the sheet, respectively, the print data being input from an external device, comprises memory means including a page memory having an empty area and an input buffer for successively storing the series of the print data input form the external device, printing means for printing the first and second print data stored in the memory means on the obverse and reverse faces of the sheet, judging means for judging as to whether the empty area is no longer available to store one of the first and second print data while the series of the print data are being stored into the memory means, and control means for controlling the printing means to print the first and second print data on both of the obverse and reverse faces of the sheet when the first and second print data are completely stored in the memory means, and to forcibly print only the first print data on the obverse face of the sheet when it is judged by the judging means that the empty area is no longer available for storing the second data and when the first print data is completely stored in the memory means.

The printing means of the perfecting printer according to this invention includes a character generator for generating a bit pattern based on the print data stored in the memory means and a printing unit for successively printing the bit pattern on both of the obverse and reverse faces of the sheet.

According to another aspect of this invention, a method of controlling a double-face printing operation of a perfecting printer including a page memory having an empty area for storing a series of print data including first print data and second print data to be printed on obverse and reverse faces of at least one sheet, and a control unit for controlling a printing operation of the printer on the basis of the series of the print data, comprises the steps of storing the series of the print data into the page memory while sectioning the series of the print data into plural blocks, judging as to whether the empty area is no longer available to store one of the first and second print data while the series of the print data are being stored into the page memory and printing the first and second print data on both of the obverse and reverse faces of the sheet when the first and second print data are completely stored in the page memory, or forcibly printing only the first print data on the obverse face of the sheet when it is judged in the judging step that the empty area is no longer available for storing the second data and when the first print data is completely stored in the page memory.

According to the perfecting printer of this invention, even if the page memory becomes full, that is a memory-full state occurs in the page memory during the double-face printing operation, the control means forcibly prints the print data for the only obverse face (page) of a sheet and discharge the sheet having a printed image on the obverse face thereof, and erases the print data for the obverse face (page) of the sheet. Therefore, an empty area becomes available in the page memory, allowing print data to be continuously stored therein, and the printing operation can be continued based on the stored print data.

DETAILED DESCRIPTION OF THE PREFERRED EMBODIMENTS

Figure 1:
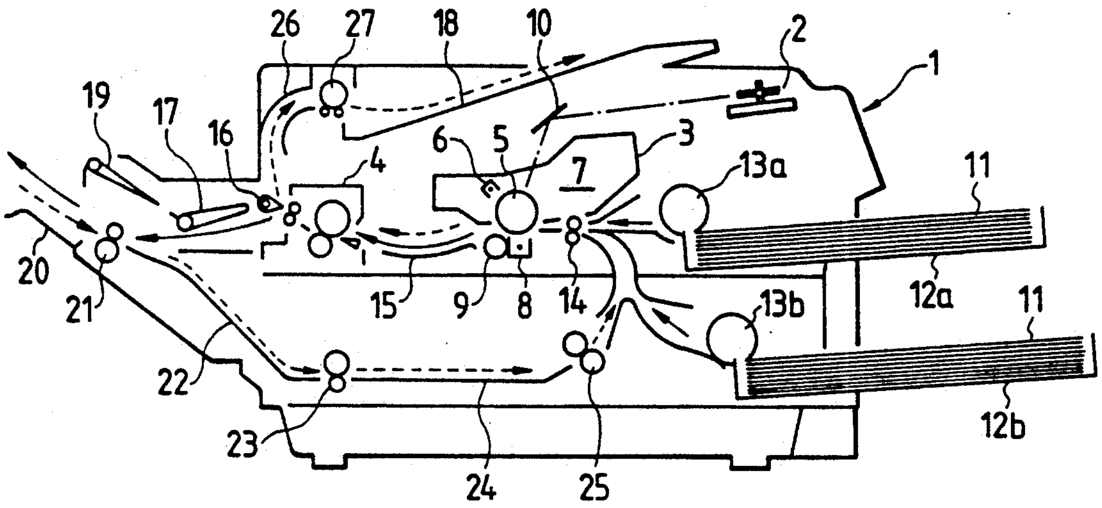
FIG. 1 is a view showing an overall arrangement of a perfecting printer according to an embodiment of the present invention.

FIG. 1 shows an overall arrangement of a perfecting printer according to an embodiment of the present invention.

In the present embodiment, the perfecting printer is used in the form of a laser printer. The laser printer includes a housing 1 accommodating therein a laser/scanner unit 2, an image recording processor 3, and an image fixing unit 4. The image recording processor 3 comprises a photosensitive drum 5, a main charger 6, an image developing unit 7, a transfer charger (transfer unit) 8, and a separator 9. The laser/scanner unit 2 applies a light image of a laser beam having a recording data on characters, graph patterns, or the like, to the photosensitive drum 5 through a reflecting mirror 10, thereby forming a latent image on the photosensitive drum 5. The latent image thus obtained is then developed into a visible image in the image developing unit and transferred onto a sheet by the transfer charger 8.

The laser printer also has a sheet feed system including two sheet cassettes 12*a*, 12*b* for accommodating sheets 11, which are mounted in one side of the housing 1. A sheet 11 is fed to the transfer unit 8 by feed rollers 13*a*, 13*b* and resist rollers 14. After an image has been transferred to the sheet 11 and the sheet 11 has been discharged from the image recording processor 3, it is fed through a feed guide 15 to the image fixing unit 4. Feed path switching levers 16 and 17 are disposed downstream of the image fixing unit 4. The feed path switching lever 16 selectively directs the sheet 11 toward a face-down tray 18 on the top of the housing 1 or toward a face-up tray 19 and a reverse tray 20 on the opposite side of the housing 1. The feed path switching lever 17 selects either the face-up tray 19 or the reverse tray 20.

A sheet on the reverse tray 20 can be reversed in direction by a device which comprises rollers 21, a reverse feed path 22, skew-feed rollers 23, and a sheet tray 24. Refeed rollers 25 are also provided which feeds a sheet on the reversed-sheet tray 24 again toward the resist rollers 14 on their upstream side. A sheet discharge roller 27 is disposed in a feed path 26 extending to the face-down tray 18.

The solid-line arrows in FIG. 1 represent a sheet feed path or route for feeding a sheet therealong when the sheet is first printed in a double-face printing modes, and the broken-line arrows in FIG. 1 show a sheet feed path or route for feeding a sheet therealong when the sheet is printed after it is reversed.

Figure 2:
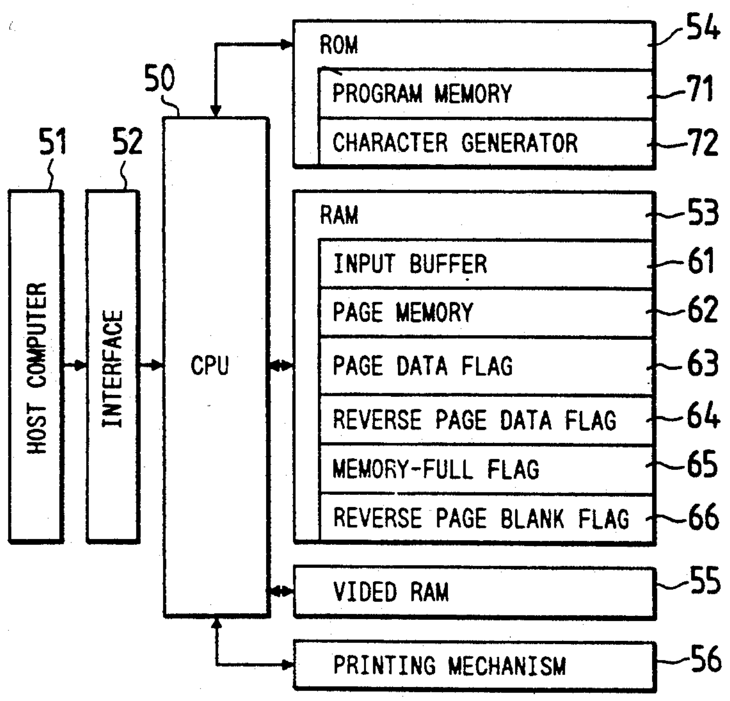
FIG. 2 is a block diagram of a control system utilized in the perfecting printer as shown in FIG. 1.

FIG. 2 is a block diagram of a control system for controlling a printing mechanism (engine) which is primarily composed of the laser/scanner unit 2.

Figure 3:
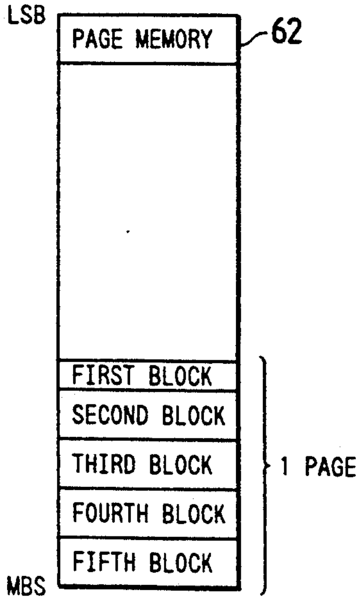
FIG. 3 is a schematic diagram of a memory map of a page memory.

The control system comprises a CPU 50 for controlling the entire printer, a RAM 53 including an input buffer 61 for temporarily storing print data for a plurality of pages which are input from an external device such as a host computer 51 through an interface 52 to the CPU 50, a page memory 62 for dividing the print data from the input buffer 61 into several blocks as shown in FIG. 3 and storing the blocked print data for the pages together with positional data indicative of recording positions on a sheet 11, an obverse page data flag 63 indicating that all data for each obverse page ( odd-numbered page) are stored in the page memory 62, a reverse page data flag 64 indicating that all data for each reverse page (even-numbered page) are stored in the page memory 62, a memory-full flag 65 indicating that the page memory 62 is full, that is, a memory-full state occurs in the page memory 62, and a reverse page blank flag 66 indicating that the reverse page is to be printed as a blank page, a ROM 54 including a program memory 71 for storing a control program for the printer, and a character generator (CG) 72 for generating a bit pattern from one block in the page memory 72 based on its print data (code), a video RAM 55 for storing the generated one-block bit pattern, and a printing mechanism (engine) 56 for printing an image corresponding to the bit pattern on a sheet.

Figure 4:
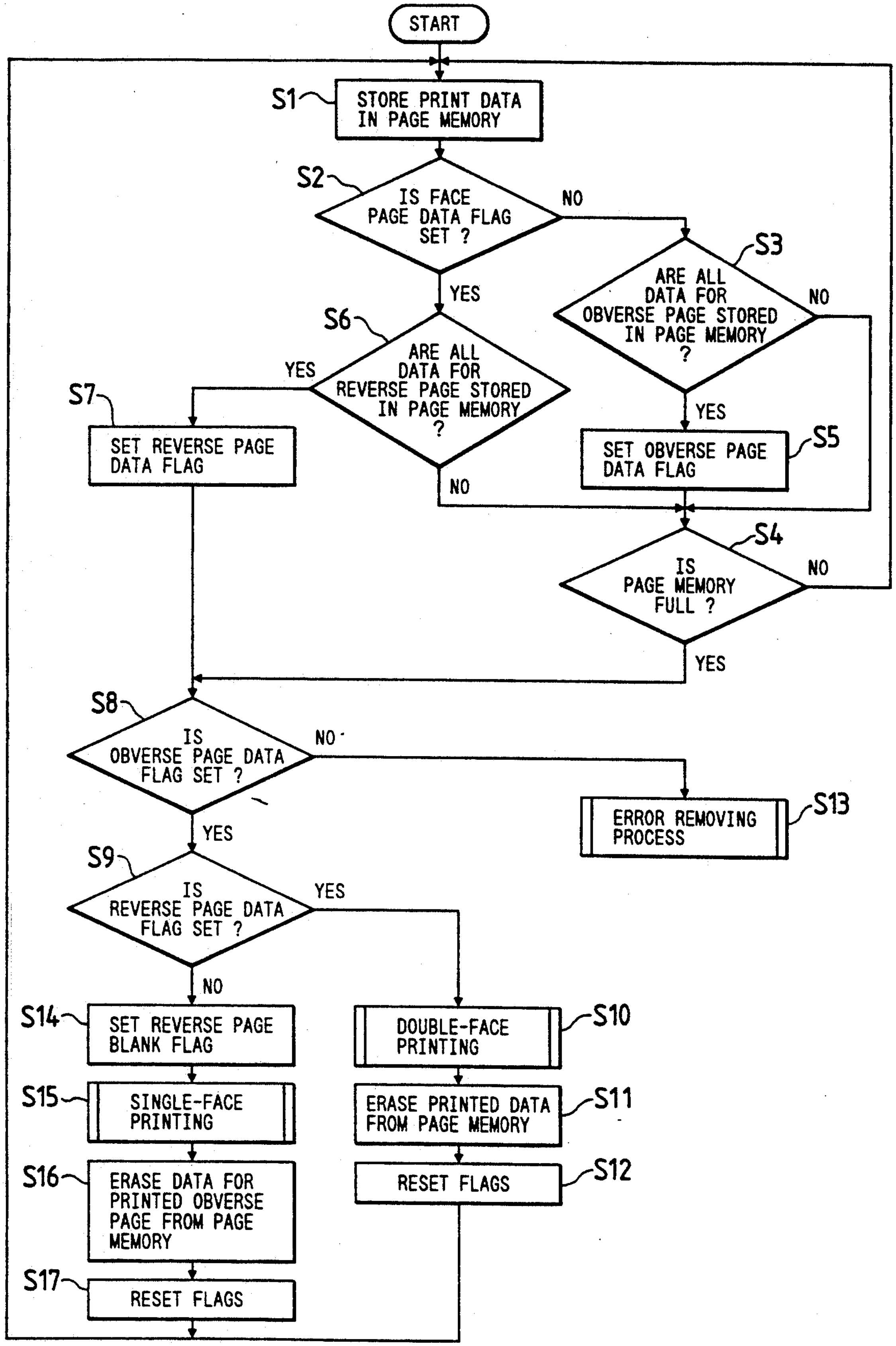
FIG. 4 is a flowchart of a control sequence of the control system as shown in FIG. 2.

An operation of the control system will now be described below with reference to the flowchart of FIG. 4 which illustrates a series of control operations of the control system.

The CPU 50 temporarily stores print data transmitted from the host computer 51 into the input buffer 61 through the interface 52, and then stores the print data into the page memory 62 block by block in a step S1. The CPU 50 determines whether the obverse page data flag 63 is set or not in a step S2. Since the obverse page data flag 63 is not yet set at this time, the CPU 50 then determines whether all data for an obverse page have been stored in the page memory 62 or not, i.e., whether one block transferred from the input buffer 61 to the page memory 62 contains an FF code indicating the end of a page in a step S3. If all data for an obverse page have not yet been stored in the page memory 62, then the CPU 50 determines whether the memory-full flag 65 is set or not, i.e., whether the storage area in the page memory 62 is full or not, in a step S4.

If the page memory 62 is not full (the memory-full flag 65 is not set), then the processing in the steps S1 through S4 is repeated until the obverse page data flag 63 is set. When all data for an obverse page are stored in the page memory 62, the obverse page data flag 62 is set in a step S5.

Then print data for a reverse page start being stored block by block in the page memory 62 in the step S1. The print data for the reverse page are successively stored until all data therefor are stored in the page memory 62 (YES in the step S6) or the page memory 62 becomes full (YES in step S4). When all data for the reverse page have been stored in the page memory 62 in the step S6, the reverse page data flag 64 is set in a step S7.

The CPU 50 then determines whether the obverse page data flag 63 and the reverse page data flag 64 are set or not in steps S8 and S9. Inasmuch as the data flags 63 and 64 have been set at this time, both faces of a sheet 11 are printed in a step S10

More specifically, one block of the print data for the reverse page, which has been stored in the page memory 62, is converted into a bit pattern by the character generator 72 and held in the video RAM 55. An image corresponding to the bit pattern is printed on the reverse face of the sheet 11 by the printing mechanism 56. The above process is repeated until all data for the reverse page of the sheet 11 is printed. Then, the sheet 11 is fed below the switching levers 16 and 17 and onto the reverse tray 20, and then reversed in direction by the reverse rollers 21. The sheet 11 thus reversed is fed again to the printing mechanism 56 through the reverse feed path 22, the skew-feed rollers 23, and the reversed-sheet tray 24. One block of the print data for the obverse page, which has been stored in the page memory 62 is converted into a bit pattern by the character generator 72 and held in the video RAM 55. An image corresponding to the bit pattern is printed on the obverse face of the sheet 11 by the printing mechanism 56. The above process is also repeated until the printing of the obverse page of the sheet 11 is completed. Thereafter, the sheet 11 is fed above the switching lever 16 and onto the facedown tray 18.

Then, the data for the printed obverse and reverse pages are erased from the page memory 62, so that an empty area is kept in the storage area in the page memory 62 in a step S11. The obverse and reverse page data flags 63 and 64 are reset in a step S12.

If the page memory 62 becomes full, that is, the memory-full state occurs in the page memory 62 before all data for an obverse page are stored in the page memory 62 (YES in the step S4 and NO in the step S8), then a message "MEMORY FULL" is displayed on a known display unit (not shown), and an alarm signal is produced by a known buzzer. The alarm signal is set as an error signal to the host computer 51, and the driving of the printer is ceased and awaits for an action by the operator in a step S13.

If the page memory 62 becomes full (that is, the memory-full state occurs in the page memory 62) after all data for an obverse page of a sheet have been stored in the page memory 62 and before all data for the reverse page of the sheet are stored in the page memory 62 (NO in the step S6, YES in the steps S4, S8 and NO in the step S9), then, the reverse page blank flag 66 in the RAM 53 is set in a step S14, and a single-face printing operation is carried out, that is, all data for the obverse page is printed in a step S15. More specifically, the reverse face of the sheet 11 is regarded as a dummy (blank) page, and one block of the print data for the obverse page, which has been stored in the page memory 62, is converted into a bit pattern by the character generator 72 and held in the video RAM 55. An image corresponding to the bit pattern is printed on the obverse face of the sheet 11 by the print mechanism 56. The above process is repeated until all data for the obverse page is forcibly printed. After the printing of the obverse page is finished, the sheet 11 is fed above the switching lever 16 which has been turned downwardly, and delivered through the feed path 26 and the discharge roller 27 onto the face-down tray 18.

Then, the data for the printed obverse page are erased from the page memory 62 in a step 16, so that an empty area is kept in the storage area in the page memory 62 in readiness for the storage of remaining data for the reverse page. Then, the obverse page data flag 63, the memory-full flag 65, and the reverse-face blank flag 66 are reset in a step S17, from which the CPU 50 returns to the step S1.

In the single-face printing operation in the step S15 after the reverse-face blank flag 66 has been set, all data for an obverse face may be printed on the obverse face of the sheet after the sheet has been reversed, and then the sheet having an image only on the obverse face thereof may be discharged.

Accordingly, even if the page memory becomes full, that is, the memory-full state occurs in the page memory, the printing operation can be effected as continuously as possible without interruption. Consequently, an operation of ceasing a printing operation and an operator's intervention, as is the case with the conventional printer, can be remarkably eliminated.

In order to increase the speed of the double-face printing operation, two sheets are supplied to the feed path and the reverse feed path, respectively, in the perfecting printer, and the printer is controlled to print the reverse face (second page) of a first sheet, the reverse face (fourth page) of a second sheet, the obverse face (first page) of the first sheet, and the obverse face (third page) of the second sheet, successively in this order. In this perfecting printer, print data are stored in the page memory 62 in blocks for the first, second, third, and fourth pages in this order, and the blocks for the second, fourth, first, and third pages in this order are successively supplied to the printing mechanism 56.

In a case where a memory-full state occurs while the blocks of print data for the third page are being loaded into the page memory 62 and hence the loading of the data is stopped, it is determined that the data for the second sheet are incompletely stored in the page memory, and that only the print data for the obverse page of the second sheet are stored. Accordingly, a dummy page is added to the third page, and after the second and first pages have been printed and the first sheet is discharged out of the printer, the second sheet is discharged out of the printer.

If a memory-full state occurs while the blocks of print data for the second page are being loaded into the page memory 62 and hence the loading of the data is stopped, it is determined that the print data for the first sheet are incompletely stored, and that only the print data for the obverse page are stored. Accordingly, a dummy page is added to the second page, and after the first page has been printed, the first sheet is discharged out of the printer.

Alternatively, a dummy page is added to the second page, and after the first page has been printed, the first sheet is fed to the reverse tray 20, and blocks of the print data for the second page are loaded into the page memory again. Thereafter, the print data for the second page is printed, and the first sheet is fed again in the loop, and discharged out of the printer.

In any of the aforesaid modes of operation, the printing process is not interrupted even when the page memory becomes full, and the double-face printing operation can be continued and completed.

According to the perfecting printer of the present invention, when the memory-full state occurs in the page memory of the perfecting printer, the sheet is forcibly discharged while only the print data completely stored in the page memory are printed on the sheet and an empty area is kept in the page memory. Therefore, interruption of printing operation, which would otherwise be caused by memory-full error, is prevented from occurring as much as possible. Thus, the operator is not required to monitor the printer at all times, and the throughput of the perfecting printer is increased.

While the invention has been described in detail and with reference to specific embodiment thereof, it would be apparent to those skilled in the art that various changes and modifications can be made therein without departing from the spirit and scope of the invention.

What is claimed is

1. A perfecting printer for printing images on obverse and reverse faces of at least one sheet according to a series of print data including first print data and second print data to be printed on obverse and reverse faces of the sheet, respectively, the print data being an input from an external device, comprising:

memory means having an empty area for successively storing the series of the print data input from the external device;

printing means for printing the first and second print data stored in said memory means on the obverse and reverse faces of the sheet, respectively;

judging means for judging as to whether the empty area is no longer available to store one of the first and second print data while the series of the print data are being stored into said memory means; and control means for controlling said printing means to print the first and second print data on both of the obverse and reverse faces of the sheet, respectively, when the first and second print data are completely stored in said memory means, and to forcibly print only the first print data on one of the obverse and reverse faces of the sheet when said judging means judges that the empty area is no longer available for storing the second print data and when the first print data is completely stored in said memory, said control means further including clearing means for clearing the first and second print data stored in said memory means when both of the first and second print data are printed, and for clearing only the first print data stored in said memory means when the first print data and a part of the second print data are stored in said memory means and said empty area is no longer available for storing a remainder of said second print data, the first print data is cleared after being printed, and then the remainder of the second print data is store after forcibly printing the first print data on the obverse face of the sheet.

2. A perfecting printer as claimed in claim 1, wherein said memory means includes a page memory for storing the series of the print data therein while sectioning the series of the print data into plural blocks, and an input buffer for temporally storing the series of the print data before the series of the print data are stored in said page memory.

3. A perfecting printer as claimed in claim 2, wherein said printing means comprises a character generator for generating bit patterns corresponding to the blocks of print data stored in said page memory one by one, and a printing unit for successively printing images corresponding to the bit patterns on the obverse and reverse faces of the sheet one by one.

4. A perfecting printer as claimed in claim 1, wherein said control means controls said printing means to make the reverse face of the sheet a blank face.

5. A perfecting printer as claimed in claim 1, further comprising sheet reversing means having a sheet reversing path for passing the sheet therethrough to reverse the sheet.

6. A perfecting printer as claimed in claim 4, wherein when said judging means judges that the first and second print data are completely stored in said memory means, said control means controls said sheet reversing means to pass therethrough the sheet after the first print data has been printed.

7. A perfecting printer as claimed in claim 4, further comprising sheet discharging means for discharging the sheet to an outside, of said printer, and wherein when said judging means judges that the empty area is no longer available for storing the second print data, said control means controls said reversing means not to be driven and controls said sheet discharging means to discharge the sheet to the outside side after the first print data has been forcibly printed.

8. A perfecting printer as claimed in claim 1, wherein said memory means stores the first and second print data therein in this order.

9. A method of controlling a double-face printing operation of a perfecting printer including a page memory having an empty area for storing a series of print data including first print data and second print data to be printed on obverse and reverse faces of at least one sheet, respectively, and a control unit for controlling a printing operation of the printer according to the series of the print data, comprising the steps of:

storing the series of the print data into the page memory while sectioning the series of print data into plural blocks;

judging as to whether the empty area is no longer available to store one of the first and second print data while the series of the print data are being stored into the page memory;

printing the first and second print data on both of the obverse and reverse faces of the sheet, respectively, when the first and second print data are completely stored in the page memory, or forcibly printing only the first print data on one of the obverse and reverse faces of the sheet when said judging step judges that the empty area is no longer available for storing the second print data and when the first print data is completely stored in the page memory; and clearing the first print data stored in the page memory after the forcible printing, and storing the second print data completely in the page memory.

10. A perfecting printer as claimed in claim 9, further comprising a second step of judging as to whether entire print data for both of the obverse and reverse faces of a sheet are completely stored in the page memory, and printing the entire print data on the obverse, and reverse faces of the sheet if said second judging step judges that the entire print data are completely stored in the page memory, thereby performing a double-face printing operation.

11. A perfecting printer as claimed in claim 9, further comprising a step of reversing the sheet after the first print data has been printed when said judging step judges that the empty area is no longer available to store one of the first and second print data.

12. A perfecting printer as claimed in claim 9, wherein said storing step comprises a step of storing the first and second print data into the page memory in this order.

* * * * *